United States Patent [19]

Weinstein et al.

[11] Patent Number: 4,491,463
[45] Date of Patent: Jan. 1, 1985

[54] LASER SIZING METHOD AND APPARATUS FOR FIBER OPTIC BUFFERS

[75] Inventors: Paul Weinstein, Orange; Joseph Winter, New Haven, both of Conn.

[73] Assignee: Olin Corporation, New Haven, Conn.

[21] Appl. No.: 517,302

[22] Filed: Jul. 26, 1983

[51] Int. Cl.³ .................. C03D 37/10; C03C 25/00
[52] U.S. Cl. .................... 65/2; 65/11.1; 65/23; 134/1; 219/121 LS; 219/121 LH; 219/121 LJ
[58] Field of Search ............... 134/1; 65/2, 11.1, 23; 219/121 LS, 121 LH, 121 LJ

[56] References Cited

U.S. PATENT DOCUMENTS

| 3,865,564 | 2/1975 | Jaeger et al. | 65/2 |
|---|---|---|---|
| 3,981,705 | 9/1976 | Jaeger et al. | 65/2 |
| 4,129,433 | 12/1978 | Jaeger et al. | 65/2 |
| 4,135,902 | 1/1979 | Oehrle | 65/2 |
| 4,170,028 | 10/1979 | DeBenedictis et al. | 358/285 |
| 4,170,726 | 10/1979 | Okuda | 219/121 LJ |
| 4,215,263 | 7/1980 | Grey et al. | 219/121 L |

FOREIGN PATENT DOCUMENTS

| 144368 | 10/1980 | German Democratic Rep. | 219/121 LM |
|---|---|---|---|
| 125038 | 11/1978 | Japan | 65/3.11 |
| 55-8954 | 3/1980 | Japan | 65/3.11 |

OTHER PUBLICATIONS

Fabrication of Channel Optical Waveguides in Glass by CW Laser Heating, Jou. App. Physics, vol. 45, #11, Nov. 1974, Pavlopoules et al., pp. 4964–4968.

Primary Examiner—Robert Lindsay
Attorney, Agent, or Firm—Barry L. Kelmachter; Howard M. Cohn; Paul Weinstein

[57] ABSTRACT

A system for machining and sizing optical fibers is described herein. The system uses a laser beam to machine oversized regions of a buffer material surrounding an optical fiber to create a coated optical fiber having a substantially uniform maximum outer dimension that is within a desired tolerance specification. The machining of the buffer material to size the optical fiber is accomplished by generating at least one laser beam transverse to the buffer material, rotating the beam or beams about an axis coaxial with the optical axis of the optical fiber, and moving the fiber past the rotating laser beam or beams. The rotating laser beam or beams vaporize any excess or oversized regions of buffer material and substantially provide the optical fiber with the desired outer dimension or diameter.

20 Claims, 4 Drawing Figures

LASER SIZING METHOD AND APPARATUS FOR FIBER OPTIC BUFFERS

This application is related to copending U.S. patent application Ser. No. 517,303, filed on July 26, 1983 to Weinstein et al. for LASER SIZING OF OPTICAL FIBERS.

This invention relates to the sizing of optical fibers.

The use of optical fiber cables has bcome widespread in communication applications. This is mainly due to such advantageous low weight, low less and a relatively wide transmission band. For many applications such as development in under sea and underground environments, the cables are fabricated with a metal containment tube surrounding one or more optical fibers. The metal tube protects the fiber or fibers and also serves in a variety of roles. For example, the containment tube may act as a strength member, as an electrical conductor and/or as an environmental barrier.

One of the problems associated with the fabrication of such optical fiber cables is the lack of a uniform outer dimension for most optical fibers. Frequently, optical fibers coated with a protective or buffer material have bumps, distortions and/or discontinuities along their outer periphery. These random bumps, distortions and/or discontinuities cause the fiber to have an irregular outer dimension and make fabrication of relavively uniform protective containment tubes difficult. For example, they may cause a containment tube having an irregular outer dimension to be formed. If the bumps, distortions and/or discontinuities are located in the metal tube seam area, they could hamper sealing of the seam. These random bumps, distortions and/or discontinuities could also lead to fiber damage. For example, if the containment tube is a preformed tube having an inner periphery close in tolerance to the fiber outer dimension, excess buffer material could cause the fiber to kink, break and/or bend during fiber insertion into the tube.

As a result of these problems, the sizing of optical fibers has been of concern to cable manufacturers. Besides manufacturing concerns, precise diameter control of optical fibers is desirable because it minimizes optical losses and facilitates low-loss splicing of individual glass fibers.

Optical fibers are generally made using a drawing technique. In some optical fiber fabrication systems, a laser beam is used to heat a glass preform from which the glass fiber is drawn. The fabrication systems also generally include an optical system for focusing the laser beam around the glass preform. U.S. Pat. Nos. 3,981,705 to Jaeger et al., 4,135,902 to Oehrle and 4,215,263 to Grey et al. illustrate some of the optical fiber fabrication systems known in the art employing laser heating devices.

In one optical fiber fabrication system, a laser beam is used to heat the end of the preform until the glass is in a molten state. The fiber is thereafter drawn from the molten region. The diameter of the drawn fiber is monitored and the drawing parameters are changed in response to fiber diameter variations in order to obtain a fiber of approximately constant diameter. U.S. Pat. No. 3,865,564 to Jaeger et al. illustrates this type of fabrication system.

In another type of system, an optical fiber is drawn from a preform using a laser whose output power is varied periodically. The pulsing of the laser causes diameter variations in the optical fibers. By pulsing the laser at a desired rate, a desired set of periodic diameter variations can be created in the fiber. U.S. Pat. No. 4,129,433 to Jaeger et al. describes this type of system.

The goal of producing coated glass fibers having substantially uniform outer diameters has not always been achieved with these systems. Therefore, it becomes desirable to incorporate into an optical fiber cable fabrication system an apparatus for sizing and machining the optical fibers to ensure that the fibers do not exceed a desired outer dimension.

In accordance with the present invention, an optical fiber machining and sizing system is provided. The system of the present invention uses a high energy beam to machine oversized regions of a protective layer surrounding an optical fiber to create a coated optical fiber having a substantially uniform maximum outer dimension that is within a desired tolerance specification.

The machining of the protective layer or the buffer material to size the optical fiber is accomplished by generating at least one high energy beam, preferably at least one laser beam, transverse to the buffer material and rotating said at least one beam about an axis coaxial with the optical axis of the optical fiber. The rotating beam or beams vaporize any excess or oversized regions of buffer material and provide the optical fiber with a desired outer dimension or diameter.

The sizing system of the present invention includes a rotating table having an aperture through which the optical fiber to be sized passes. The table is arranged to rotate about an axis coaxial with the optical axis of the optical fiber preferably with a relatively high degree of accuracy. At least one high power laser beam generator for providing at least one preferably collimated laser beam transverse to the buffer material is mounted to the rotating table.

In a preferred embodiment, two high power laser generators for providing two parallel collimated laser beams transverse to the buffer material are mounted on the rotating table. The generators are preferably arranged so that the gap between the collimated beams is substantially equal to the desired outer dimension or diameter for the optical fiber. In operation, the laser beams are rotated about the optical fiber by rotating the table. As the optical fiber passes between the rotating beams, any portion of the buffer material that exceeds the gap between the laser beams is vaporized.

After the rotating laser beam or beams have passed the optical fiber, they are absorbed by an appropriate absorbing device or devices. Preferably, each absorbing device is also mounted on the rotating table.

It is believed that it is possible using the laser sizing system of the present invention to size an optical fiber to have a maximum outer dimension preferably within about 0.002" and most preferably within about 0.001" tolerance of a desired optical fiber outer dimension. The use of multiple laser beams to size an optical fiber is particularly advantageous since it increases the throughput of the system. If needed, a plurality of rotating laser beam sizing systems may be axially spaced along the direction of movement of the optical fiber to further increase the throughput.

If desired, the throughput of the laser sizing system of the present invention may be increased by scanning the rotating laser beam or beams along the optical fiber parallel to the optical fiber axis. While any suitable scanning means may be incorporated into the laser sizing system, it is preferred to use a multi-faceted polygonal scanning mirror adapted to rotate about an axis substantially perpendicular to the direction of movement of the optical fiber to provide laser beam scanning. When using such a scanning laser sizing system, preferably each laser beam generator is mounted on the rotating table so that each laser beam is generated longitudinally of and most preferably substantially parallel to the direction of movement of the optical fiber. Each laser beam is then redirected substantially transverse to the buffer material by reflecting it off one of the facets of the rotating scaning mirror.

It is an object of the present invention to provide a system for sizing optical fibers to provide them with a desired outer dimension.

It is a further object of the present invention to provide a laser machining apparatus for sizing the above optical fibers.

It is yet a further object of the present invention to provide a process for using the above laser sizing apparatus.

These and other objects will become more apparent from the following description and drawings in which like elements have been given like reference numbers.

In accordance with the present invention, it is proposed to provide a technique for insuring that a coated optical fiber has a substantially uniform maximum outer dimension or diameter that is within a desired tolerance specification. The technique of the present invention uses at least one rotating high energy beam to size the optical fiber and to remove any excess or oversized regions of buffer material from the optical fiber.

Figure 1:
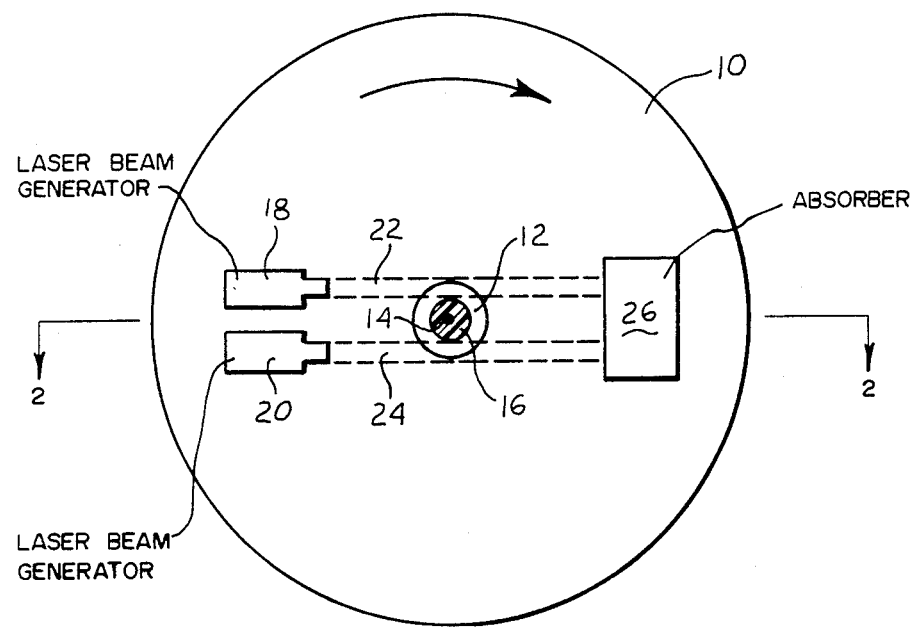
FIG. 1 is a schematic representation in partial cross section of an apparatus for sizing an optical fiber.
Figure 2:
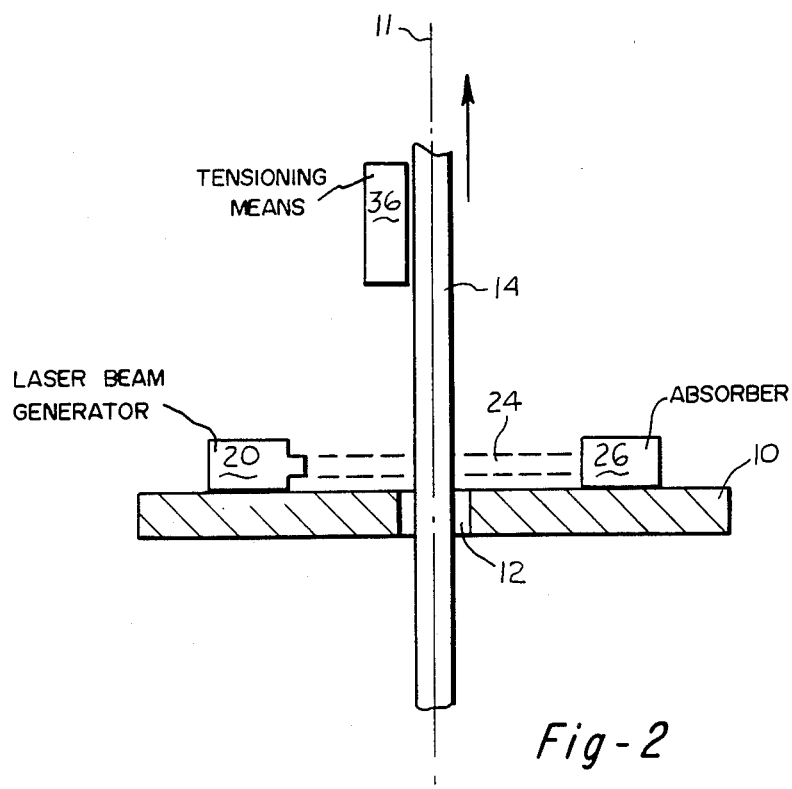
FIG. 2 is a cross-sectional view of the apparatus of FIG. 1 taken along lines 2—2 of FIG. 1.

Referring now to FIGS. 1 and 2, an exemplary laser machining and sizing system is illustrated. The system includes a table 10 adapted to rotate about an axis coaxial with the optical axis 11 of an optical fiber 14 to be sized. To enable the table 10 to rotate about the desired axis and about the optical fiber 14 to be sized, an aperture or hole 12 is provided in the table 10 through which the optical fiber 14 passes. The aperture 12 is sized so that the optical fiber 14 and any excess or oversized regions of buffer material 16 can pass therethrough.

Any suitable drive and support means (not shown) known in the art may be used to rotate and support the table 10. However, it is preferred that the drive and support means permit rotation of the table 10 about the optical axis 11 with a relatively high degree of accuracy. For example, the tolerance on the coaxial nature of the rotational axis of the table 10 and the optical axis 11 of the fiber 14 should preferably be within about 0.002" and most preferably within about 0001". It is particularly important to avoid as much as possible any wobble or eccentricity of the rotating table 10.

In a preferred embodiment of the present invention, two laser beam generators 18 and 20 for providing preferably collimated, substantially parallel laser beams 22 and 24 are mounted to the table 10. The laser beam generators 18 and 20 may be mounted on the table 10 by any suitable mounting means (not shown) known in the art. The laser beam generators 18 and 20 preferably are arranged to generate the laser beams 22 and 24 substantially transverse to the buffer material 16 and the direction of movement of the optical fiber and preferably orthogonally thereof. The laser beam generators 18 and 20 also are arranged so that the distance or gap between the beams 22 and 24 is substantially equal to the desired outer dimension or diameter for the optical fiber. Preferably, the gap between the beams is such that the optical fiber will be sized within about 0.002" tolerance of a desired optical fiber outer dimension. In a most preferred embodiment, the gap is such that the optical fiber will be sized within about 0001" tolerance of a desired optical fiber outer dimension.

While laser beam generators 18 and 20 may comprise any suitable laser beam generator known in the art, they are preferably high power laser beam generators. High power laser beam generators are preferred because they are capable of generating laser beams having the relatively high temperatures needed to vaporize typical plastic-type buffer materials used to coat optical fibers. In a preferred embodiment, the laser beam generators 18 and 20 each comprise a gas laser such as a $CO_2$ laser. The laser beams 22 and 24 generated by laser beam generators 18 and 20 may have any desired shape.

During the sizing operation, it is important that the optical fiber 14 be maintained substantially straight as it passes through the laser beams 22 and 24. To this end, it is desirable that the optical fiber 14 be placed under a slight tension as it passes through the laser beams 22 and 24. Any suitable tensioning means 36 known in the art such as a powered take-up reel may be used to apply a slight tension to the fiber 14. The tensioning means 36 may also be used to move the fiber 14 through the sizing system.

Also mounted on the table 10 is at least one absorbing device 26. After the laser beams 22 and 24 have passed the fiber 14, they are absorbed by the absorbing device 26. The absorbing devices 26 may be mounted to the table 10 by any suitable mounting means (not shown) known in the art and may comprise any conventional absorbing device known in the art. Alternatively, the absorbing device may be separate from the table 10 but in a surrounding arrangement. For example, the absorbing device may comprise a water-cooled, black-box surrounding the table 10.

In operation, the table 10 is rotated at a desired speed and the optical fiber 14, preferably under a slight tension, is pulled through the aperture 12 by tensioning means 36. As the optical fiber 14 passes between the rotating beams 22 and 24, any portion of the buffer material 16 exceeding the gap between the beams is vaporized by the laser beams 22 and 24. The speed at which the optical fiber moves through the laser sizing system is related to the rotational speed of the table 10 and the laser beams 22 and 24.

The use of multiple rotating laser beams is particularly advantageous since it increases the throughput of the optical fiber sizing system. If it is desired to further increase system throughput, a plurality of rotating tables each containing at least one laser beam generator may be axially spaced along the optical fiber 14 in the direction of movement of the optical fiber.

Figure 3:
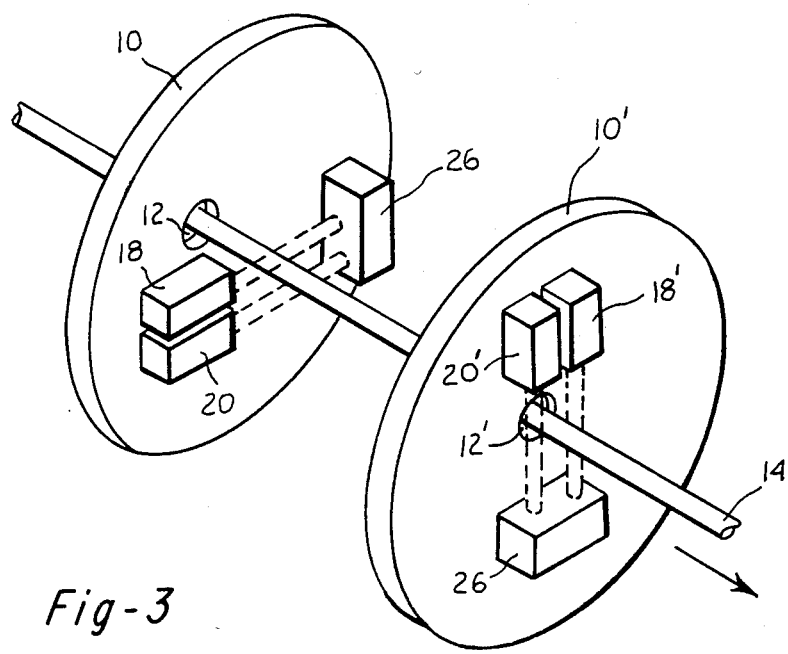
FIG. 3 is a schematic representation of a laser sizing system having multiple rotating tables.

Referring now to FIG. 3, a laser sizing system using multiple rotating tables 10 and 10' is illustrated. Each of the tables 10 and 10' has an aperture 12 and 12', respectively, through which the optical fiber passes and has a plurality of laser beam generators 18 and 20 and 18' and 20', respectively, and an appropriate absorbing device 26 mounted to it. The laser beam generators and the absorbing devices are mounted to and arranged on each table as described hereinabove. When using multiple rotating tables to increase system throughput, it is desirable to offset in a radial sense the laser beam generators of each table with respect to the laser beam generators of the other table or tables. As shown in FIG. 3, the laser beam generators 18 and 20 on table 10 are offset by an angle of about 90° from the laser beam generators 18' and 20' on table 10'. While any desired offset angle may be used, the offset angle will generally be related to the number of rotating tables employed in the sizing system.

While it is preferred in accordance with the present invention to use two substantially parallel, spaced apart rotating laser beams to size the optical fibers, it is possible to use a single rotating laser beam to size an optical fiber. Where only a single rotating beam is to be used, only one laser beam generator would be mounted on the rotating table 10. Here again, the laser beam generator would be arranged to generate a preferably collimated laser beam in a direction substantially transverse to the buffer material coating and to the direction of movement of the optical fiber. As the laser beam rotates about the optical fiber, it vaporizes and removes any oversized regions of buffer material. The laser beam should preferably size the optical fiber within about 0.002" tolerance of a desired optical fiber outer dimension and most preferably size the optical fiber within about 0.001" tolerance of a desired outer dimension. An appropriate absorbing device is preferably mounted on the table to absorb the laser beam after it passes the optical fiber.

Figure 4:
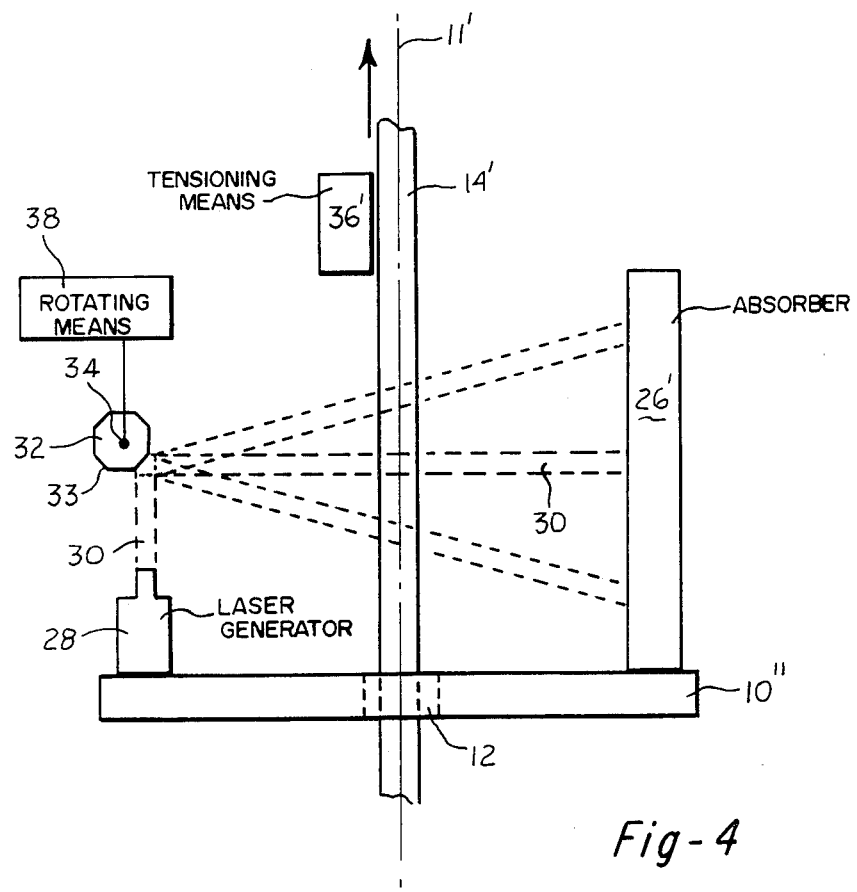
FIG. 4 is a top view of an alternative embodiment of an apparatus for sizing an optical fiber.

Referring now to FIG. 4, yet another approach for increasing system throughput is shown. In this approach at least one rotating laser beam is scanned along the optical fiber to increase the length of the optical fiber segment engaged by the laser beam. Scanning the laser beam along the optical fiber in this manner permits the fiber to be advanced at a higher rate of speed.

Table 10" is supported for rotation and driven by any suitable means (not shown) known in the art. As before, the table 10" is rotated about an axis coaxial with the optical axis 11' of the optical fiber 14'. Hereto, the support and drive means should be capable of rotating the table 10" with a relatively high degree of accuracy.

At least one laser beam generator 28 is mounted onto the table 10" by any suitable conventional mounting means not shown. Each laser beam generator 28 may comprise any suitable laser beam generator known in the art; however, it is preferred to use a high power laser beam generator such as a gas laser. Each laser beam generator 28 should preferably be mounted to the table 10" so that a preferably collimated laser beam 30 is generated longitudinally of and most preferably substantially parallel to the optical axis 11' of the optical fiber 14' and to the direction of movement of the optical fiber 14'.

Also mounted on the table 10" is a scanning mirror 32 adapted to rotate about an axis 34 substantially perpendicular to the optical axis 11' and the direction of movement of the optical fiber 14'. The scanning mirror 32 may comprise any conventional scanning mirror known in the art; however, it is preferred to use a multi-faceted, polygonal scanning mirror such as that shown in U.S. Pat. No. 4,170,028 to DeBenedictis et al. The scanning mirror 32 may be mounted to the table 10" by any suitable mounting means (not shown) known in the art. Any suitable means 38 known in the art may be used to rotate the scanning mirror 32 about the axis 34.

The facets 33 of the mirror 32 are preferably mirrored surfaces for reflecting each laser beam 30 as it impinges upon them. The rotation of the mirror 32 about the axis 34 will cause each impinging laser beam 30 to be reflected and redirected in a direction substantially transverse to the buffer material and to the direction of movement of the optical fiber 14'. It will also cause each reflected and redirected laser beam 30 to scan longitudinally along part of the length of the optical fiber 14'. Each laser beam 30 will reflect off one facet 33 of the mirror during a complete scan cycle and will shift to the adjacent facet 33 for the following scan cycle.

In a preferred manner of using this scanning approach, two spaced apart laser beam generators 28 for creating two substantially parallel, spaced apart, preferably collimated laser beams 30 are mounted to the table 10". As before, the gap between the generators 28 is substantially equal to a desired outer dimension for the optical fiber 14'. Each laser beam 30 is generated longitudinally of and most preferably substantially parallel to the optical axis 11' and to the direction of movement of the optical fiber 14'. It is then redirected substantially transverse to the buffer material and to the optical fiber direction of movement by the rotating scanning mirror 32. If desired, each laser beam 30 may have its own rotating scanning mirror. The redirected laser beams 30 pass on opposed sides of the fiber 14' and vaporize any portion of the buffer material exceeding the gap between the beams 30. As before, an absorber 26' is provided to absorb each laser beam 30 after it passes the fiber 14'.

It is desirable during the sizing operation that the optical fiber 14' be maintained substantially straight. Any suitable means 36' known in the art may be used to apply a slight tension to the optical fiber 14' to maintain it substantially straight as it passes the rotating scanning beam or beams. The tensioning means 36' may also be used to pull the optical fiber 14' through the sizing system.

If needed, the scanning mirror 32 may be provided with a cooling system not shown. Any suitable cooling system known in the art may be used to cool the scanning mirror 32. For example, the scanning mirror 32 may be air-cooled or water-cooled.

After the optical fiber has been sized, it may be passed to an apparatus not shown for fabricating a metal containment tube not shown about the fiber itself or about a plurality of sized fibers. A suitable system for fabricating an optical fiber cable having a metal containment tube surrounding one or more fibers is shown in copending U.S. patent application Ser. Nos. 413,846, filed Sept. 1, 1982; 497,639, filed May 24, 1983; 497,535, filed May 24, 1983; 497,533, filed May 24, 1983; 497,546, filed May 24, 1983; and 497,522, filed May 24, 1983, all to Winter et al. The laser sizing system of the present invention may be used as part of an on-line optical fiber cable fabrication system or may be used off-line as a separate optical fiber sizing operation.

The laser machining and sizing technique of the present invention may be performed in any suitable atmosphere. For example, it may be performed in air, in an inert gas atmosphere or in a reactive atmosphere. If desired, it may be performed in a vacuum.

While it is preferred in accordance with the present invention to generate a plurality of laser beams by mounting a plurality of laser beam generators to a rotating table, it is possible to generate a plurality of laser beams using a single laser beam generator and an appropriate beam splitting device. The beam splitting device may comprise any suitable beam splitter known in the art.

While it is preferred to generate collimated laser beams to remove the oversized or excess buffer material, it is possible to also use focused beams to remove the oversized regions or excess buffer material. The focused beams may be produced using any conventional means known in the art.

While it is preferred to use at least one laser beam to remove the oversized regions or excess buffer material, it is also possible to use other types of high energy beams to size the optical fiber. For example, an electron beam may be used to remove any excess buffer material.

While in the embodiment of FIG. 4, it is preferred to generate each laser beam longitudinally of and most preferably substantially parallel to the optical fiber optical axis, each laser beam may be generated at any desired angle relative to the optical fiber optical axis.

The patents and patent applications set forth in the specification are intended to be incorporated by reference herein.

It is apparent that there has been provided in accordance with this invention a laser sizing system for fiber optic buffers which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method for sizing an optical fiber having a buffer material surrounding a glass fiber to provide said optical fiber with a desired outer dimension, said method comprising:
   providing a table rotatable about an axis coaxial with the optical axis of said optical fiber;
   providing means for generating at least one high energy beam substantially transverse to said buffer material, said at least one beam generating means being mounted to said rotatable table;
   rotating said table with said beam generating means about said coaxial axis and thereby rotating said at least one beam about said optical fiber; and
   moving said optical fiber past said at least one rotating beam,
   whereby oversized regions of said buffer material extending beyond said desired outer dimension are vaporized by said at least one rotating beam.

2. The method of claim 1 further comprising:
   providing said table with an aperture; and
   said moving step including passing said optical fiber through said aperture.

3. The method of claim 1 further comprising:
   maintaining said optical fiber substantially straight as said fiber moves past said at least one rotating beam.

4. The method of claim 3 wherein said maintaining step comprises:
   applying a slight tension to said optical fiber to maintain said fiber substantially straight.

5. The method of claim 1 further comprising: absorbing said at least one beam after it passes said optical fiber.

6. The method of claim 1 further comprising:
   said step of providing means for generating said at least one beam comprising providing means for generating two substantially parallel, spaced apart laser beams substantially transverse to said buffer material, said laser beams being spaced apart by a gap substantially equal to said desired outer dimension;
   said rotating step comprising rotating said two laser beams about said fiber optical axis; and
   said moving step comprising passing said fiber between said rotating beams,
   whereby portions of said buffer material exceeding said gap are vaporized by said rotating laser beams.

7. The method of claim 1 further comprising:
   longitudinally scanning said at least one beam along said optical fiber.

8. The method of claim 7 wherein:
   said scanning step comprises providing a multifaceted mirror and rotating said mirror; and
   redirecting said at least one beam in a direction substantially transverse to said buffer material by reflecting said at least one beam with said mirror.

9. The method of claim 1 further comprising:
   generating at least one additional high energy beam substantially transverse to said buffer material, said at least one additional beam being radially offset with respect to said at least one beam and being longitudinally displaced therefrom along said optical axis;
   rotating each of said beams about said fiber; and
   passing said fiber between said rotating beams.

10. An apparatus for sizing a coated optical fiber having a buffer material surrounding a glass fiber to provide said optical fiber with a desired outer dimension, said apparatus comprising:
    means for generating at least one high energy beam substantially transverse to said buffer material;
    means for rotating said at least one beam generator about said optical fiber, said rotating means comprising a table adapted to rotate about an axis coaxial with the optical axis of said optical fiber;
    said beam generating means being mounted to said table; and
    means for moving said optical fiber past said at least one rotating beam,
    whereby oversized regions of said buffer material extedding beyond said desired outer dimension are vaporized by said at least one rotating beam.

11. The apparatus of claim 10 further comprising:
    said table having an aperture through which said optical fiber passes, said aperture being sized to permit said optical fiber and said oversized regions of said buffer material to pass therethrough.

12. The apparatus of claim 10 further comprising:
    means for maintaining said optical fiber substantially straight as said optical fiber moves past said at least one rotating beam.

13. The apparatus of claim 12 wherein said maintaining means comprises:
    means for applying a slight tension to said optical fiber, said tension applying means also causing said fiber to move past said at least one rotating beam.

14. The apparatus of claim 10 further comprising:

means for absorbing each said beam after it passes said optical fiber.

15. The apparatus of claim 10 wherein:

said beam generating means comprises means for generating two substantially parallel, spaced apart laser beams substantially transverse to said buffer material, said laser beams being spaced apart by a gap substantially equal to said desired outer dimension, whereby portions of said buffer material exceeding said gap are vaporized by said laser beams as said fiber passes between said spaced apart beams.

16. The apparatus of claim 10 further comprising:

means for longitudinally scanning said at least one beam along said optical fiber.

17. The apparatus of claim 16 further comprising:

said beam generating means comprising means for generating at least one laser beam and means for redirecting each said laser beam in a direction substantially transverse to said buffer material;

said redirecting means comprising at least one multi-faceted mirror; and said scanning means comprising means for rotating said mirror, whereby each said laser beam is scanned along said optical fiber by impinging said laser beam upon one of said facets of said rotating mirror.

18. The apparatus of claim 10 further comprising:

means for generating at least one additional high energy beam substantially transverse to said buffer material;

said at least one additional beam generating means being longitudinally displaced from said at least one beam generating means along said optical axis;

said rotating means further comprising means for rotating said at least one additional beam about said optical fiber; and said moving means further comprising means for moving said optical fiber between said rotating beams.

19. The apparatus of claim 18 further comprising:

said at least one additional beam generating means being radially offset with respect to said at least one beam generating means.

20. The method of claim 1 wherein said rotating step comprises:

rotating said at least one beam about said optical fiber so as to provide said fiber with an outer dimension within about 0.002" of said desired outer dimension.

* * * * *